United States Patent [19]
Martinez

[11] Patent Number: 5,586,696
[45] Date of Patent: Dec. 24, 1996

[54] HAIR GROWING MANNEQUIN HEAD

[76] Inventor: Evelyn R. Martinez, 1053 S. White Rd., San Jose, Calif. 95127

[21] Appl. No.: 375,372

[22] Filed: Jan. 17, 1995

[51] Int. Cl.⁶ .............................. D06C 15/00; A63H 3/44; G09B 19/10; A41G 3/00
[52] U.S. Cl. ........................ 223/66; 223/1; 446/394; 446/296; 446/319; 434/94; 132/53
[58] Field of Search ............................ 223/66, 120, 24, 223/25, 26, 1; 446/394, 296, 319; 434/94; 2/422, 410; 132/53, 54

[56] References Cited

U.S. PATENT DOCUMENTS

| | | |
|---|---|---|
| 3,032,923 | 5/1962 | Von Sternberg ........................ 132/53 |
| 3,458,943 | 8/1969 | Trowbridge . | 
| 3,470,889 | 10/1969 | Webb ........................................ 132/53 |
| 3,610,486 | 10/1971 | Kunzmann . |
| 3,843,031 | 10/1974 | Oh et al. . |
| 3,903,640 | 9/1975 | Dunn ........................................ 446/394 |
| 4,370,137 | 1/1983 | Herzig et al. . |
| 4,403,962 | 9/1983 | La Vista . |
| 5,041,050 | 8/1991 | Ritchey et al. ........................ 446/394 |

FOREIGN PATENT DOCUMENTS

| | | | |
|---|---|---|---|
| 2559073 | 8/1985 | France ................................... 446/319 |
| 2317889 | 10/1974 | Germany ............................... 434/94 |
| 1363496 | 8/1974 | United Kingdom .................. 446/319 |

*Primary Examiner*—C. D. Crowder
*Assistant Examiner*—Bibhu Mohanty

[57] ABSTRACT

A hair growing mannequin head for practicing hair styling and hair cutting. The inventive device includes a mannequin head having a removable hair supply assembly mounted thereon for dispensing hair from an upper portion of the mannequin head. The removable hair supply assembly includes a pair of perforated helmet portions pivotally mounted together and a reel supplying hair for protrusion through the perforations. The helmet portions are biased into an offset position to lock the hair extending through the perforations for permitting cutting and styling of the hair exterior of the hair supply assembly.

6 Claims, 4 Drawing Sheets

5,586,696

HAIR GROWING MANNEQUIN HEAD

BACKGROUND OF THE INVENTION

1. Field of the Invention

The present invention relates to hair styling practice devices and more particularly pertains to a hair growing mannequin head for practicing hair styling and hair cutting.

2. Description of the Prior Art

The use of hair styling practice devices is known in the prior art. More specifically, hair styling practice devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art hair styling practice devices include U.S. Pat. No. 4,403,962; U.S. Pat. No. 4,370,137; U.S. Pat. No. 3,843,031; U.S. Pat. No. 3,610,486; and U.S. Pat. No. 3,458,943.

While these devices fulfill their respective, particular objectives and requirements, the aforementioned patents do not disclose a hair growing mannequin head for practicing hair styling and hair cutting which includes a mannequin head having a removable hair supply assembly mounted thereon for dispensing hair from an upper portion of the mannequin head, wherein the removable hair supply assembly includes a pair of perforated helmet portions pivotally mounted together and a reel supplying hair for protrusion through the perforations, with the helmet portions being biased into an offset position to selectively lock the hair extending through the perforations for permitting cutting and styling of the hair exterior of the hair supply assembly.

In these respects, the hair growing mannequin head according to the present invention substantially departs from the conventional concepts and designs of the prior art, and in so doing provides an apparatus primarily developed for the purpose of practicing hair styling and hair cutting.

SUMMARY OF THE INVENTION

In view of the foregoing disadvantages inherent in the known types of hair styling practice devices now present in the prior art, the present invention provides a new hair growing mannequin head construction wherein the same can be utilized for practicing hair styling and hair cutting. As such, the general purpose of the present invention, which will be described subsequently in greater detail, is to provide a new hair growing mannequin head apparatus and method which has many of the advantages of the hair styling practice devices mentioned heretofore and many novel features that result in a hair growing mannequin head which is not anticipated, rendered obvious, suggested, or even implied by any of the prior art hair styling practice devices, either alone or in any combination thereof.

To attain this, the present invention generally comprises a hair growing mannequin head for practicing hair styling and hair cutting. The inventive device includes a mannequin head having a removable hair supply assembly mounted thereon for dispensing hair from an upper portion of the mannequin head. The removable hair supply assembly includes a pair of perforated helmet portions pivotally mounted together and a reel supplying hair for protrusion through the perforations. The helmet portions are biased into an offset position to selectively lock the hair extending through the perforations for permitting cutting and styling of the hair exterior of the hair supply assembly.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hair growing mannequin head apparatus and method which has many of the advantages of the hair styling practice devices mentioned heretofore and many novel features that result in a hair growing mannequin head which is not anticipated, rendered obvious, suggested, or even implied by any of the prior art hair styling practice devices, either alone or in any combination thereof.

It is another object of the present invention to provide a new hair growing mannequin head which may be easily and efficiently manufactured and marketed.

It is a further object of the present invention to provide a new hair growing mannequin head which is of a durable and reliable construction.

An even further object of the present invention is to provide a new hair growing mannequin head which is susceptible of a low cost of manufacture with regard to both materials and labor, and which accordingly is then susceptible of low prices of sale to the consuming public, thereby making such hair growing mannequin heads economically available to the buying public.

Still yet another object of the present invention is to provide a new hair growing mannequin head which provides in the apparatuses and methods of the prior art some of the advantages thereof, while simultaneously overcoming some of the disadvantages normally associated therewith.

Still another object of the present invention is to provide a new hair growing mannequin head for practicing hair styling and hair cutting Yet another object of the present invention is to provide a new hair growing mannequin head which includes a mannequin head having a removable hair supply assembly mounted thereon for dispensing hair from an upper portion of the mannequin head, wherein the removable hair supply assembly includes a pair of perforated helmet portions pivotally mounted together and a reel supplying hair for protrusion through the perforations, with the helmet portions being biased into an offset position to selectively lock the hair extending through the perforations for permitting cutting and styling of the hair exterior of the hair supply assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
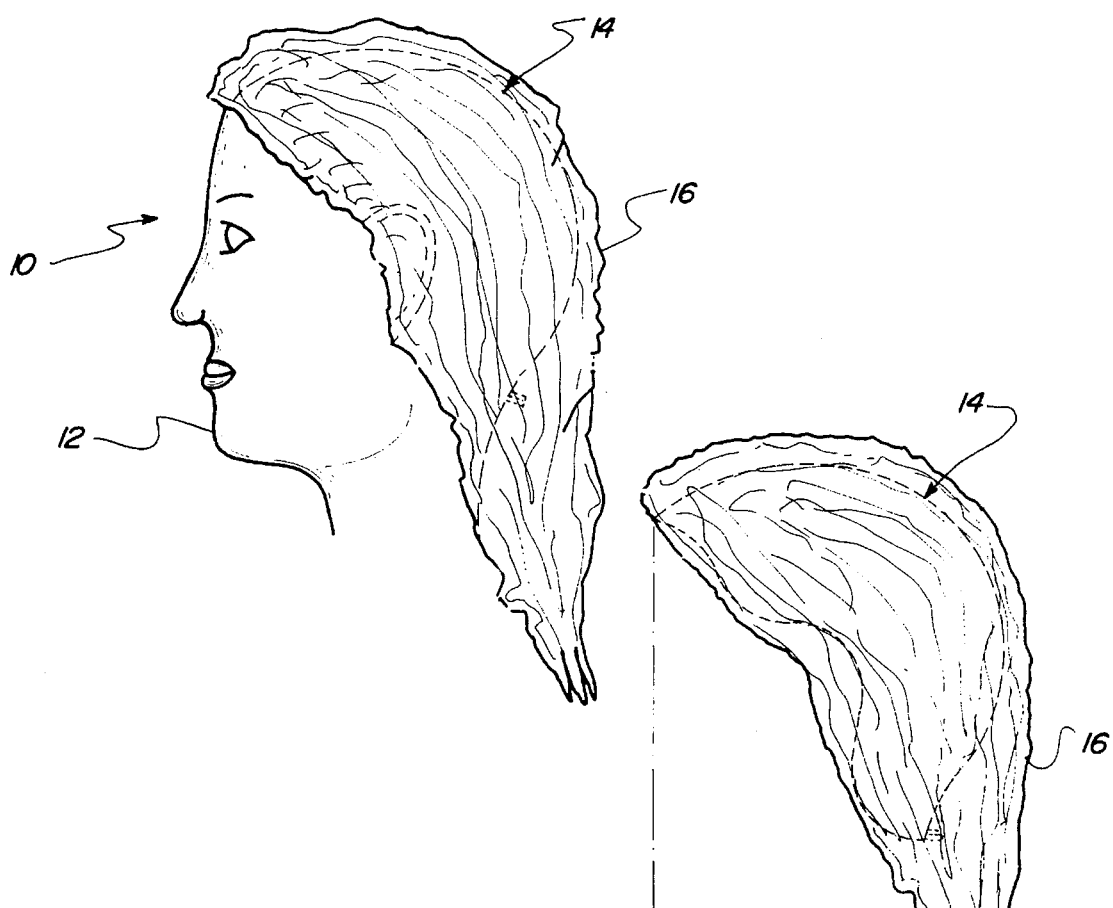
FIG. 1 is a side elevation view of a hair growing mannequin head according to the present invention.

With reference now to the drawings, and in particular to FIGS. 1–8 thereof, a new hair growing mannequin head embodying the principles and concepts of the present invention and generally designated by the reference numeral 10 will be described.

More specifically, it will be noted that the hair growing mannequin head 10 comprises a mannequin head portion 12 having a hair supply means 14 removably mounted to an upper portion of the mannequin head portion for selectively dispensing hair 16 proximal to the upper portion of the mannequin head portion, as shown in FIG. 1. By this structure, a student beautician can practice styling and cutting of the hair 16 on the mannequin head 10, with such hair be replenishable as desired.

Figure 2:
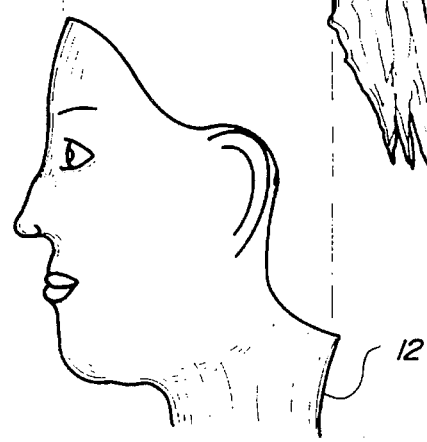
FIG. 2 is an exploded side elevation view of the invention.
Figure 3:
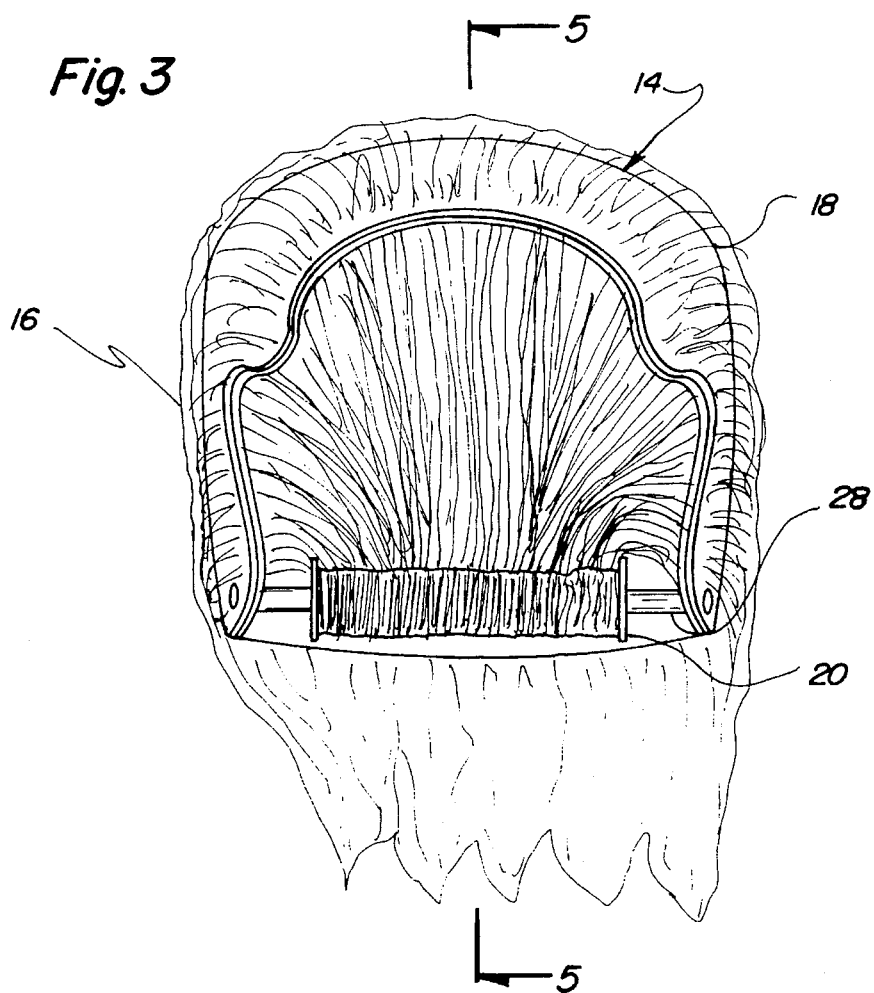
FIG. 3 is a front elevation view of a hair supply means comprising a portion of the present invention.

As shown in FIG. 2, the hair supply means 14 can be selectively separated from the mannequin head portion 12 for replacement as desired. In other words, the hair supply means 14 is in the form of a replaceable cartridge assembly which can be sold separately to provide for continued use of the mannequin head portion upon exhaustion of the hair 16 from the hair supply means.

Referring now to FIGS. 3 through 6, it can be shown that the hair supply means 14 according to the present invention 10 preferably comprises a helmet assembly 18 which can be positioned into fitting engagement with the mannequin head portion 12 to form a complete representation of a human head structure. A supply reel 20 is rotatably mounted within the helmet assembly 18 and stores thereon a plurality of strands of the hair 16 for dispensing through the helmet assembly. To this end, the helmet assembly is provided with a plurality of through-extending perforations which permit one or more strands of the hair 16 to extend through the helmet assembly for exterior positioning relative thereto. Preferably, the present invention includes a locking means for selectively retaining the hair 16 relative to the helmet assembly.

Figure 4:
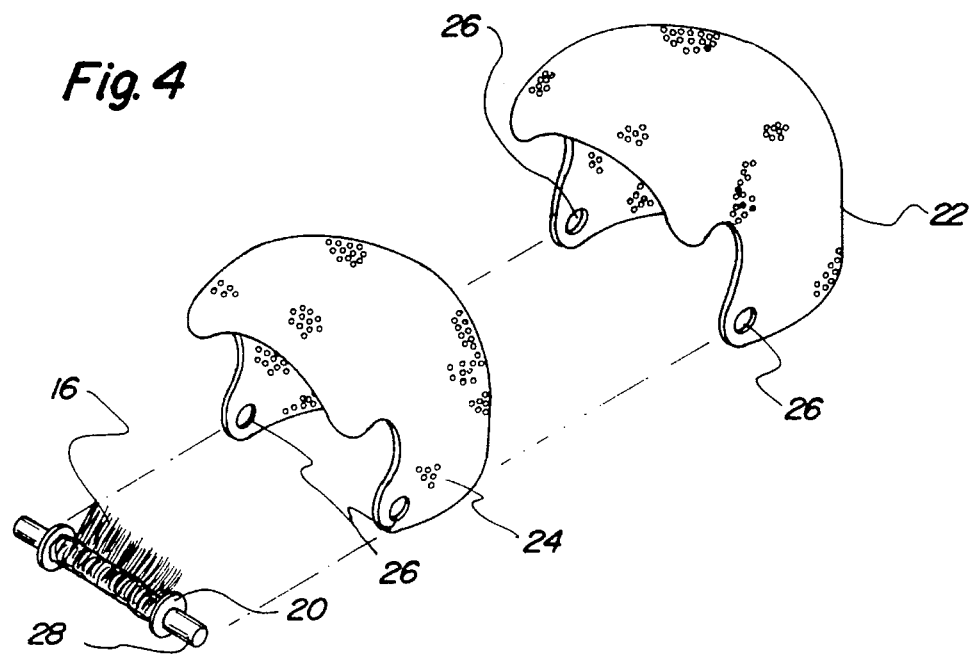
FIG. 4 is an exploded isometric illustration of the hair supply means.
Figure 5:
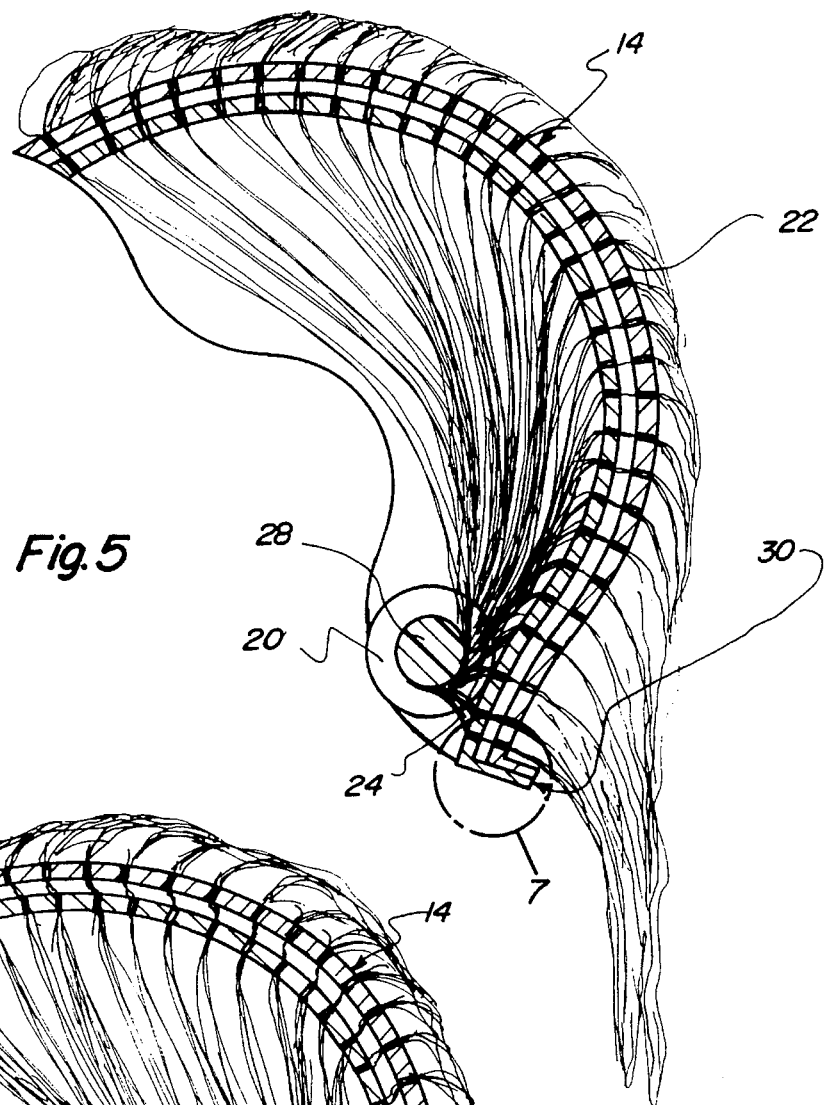
FIG. 5 is a cross sectional view taken along line 5—5 of FIG. 3.
Figure 6:
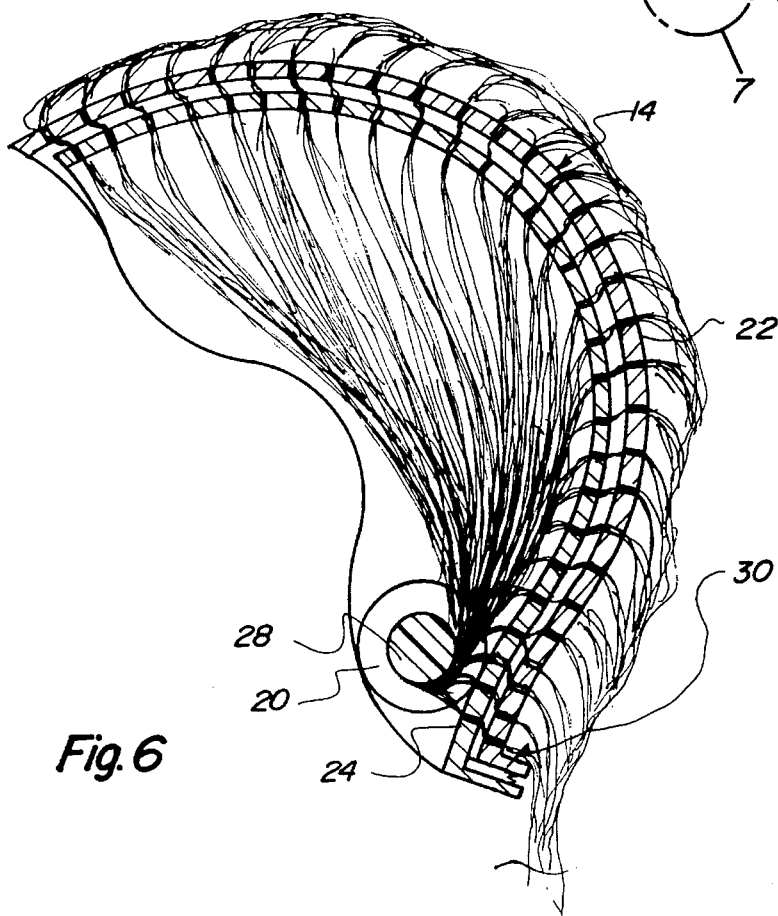
FIG. 6 is a cross sectional view of the hair supply means as shown in FIG. 5 with helmet portions thereof in an offset position.

As specifically shown in FIGS. 4 through 6, the helmet assembly 18 according to the invention 10 comprises an outer perforated helmet 22 positioned over a similarly shaped inner perforated helmet 24 such that the perforations of the helmets can be selectively aligned and offset to form the locking means. The outer perforated helmet 22 and the inner perforated helmet 24 each include a pair of opposed reel mounting apertures 26 through which an axle 28 of the reel projects both to rotatably mount the reel within the helmet assembly 18 and to pivotally couple the outer perforated helmet 22 to the inner perforated helmet 24. The hair 16 supported by the reel thus extends through perforations in the outer perforated helmet 22 and the inner perforated helmet 24, whereby a pivotal offsetting of the outer perforated helmet relative to the inner perforated helmet will selectively lock such hair relative to the helmet assembly 18, as shown in FIGS. 5 and 6.

Figure 7:
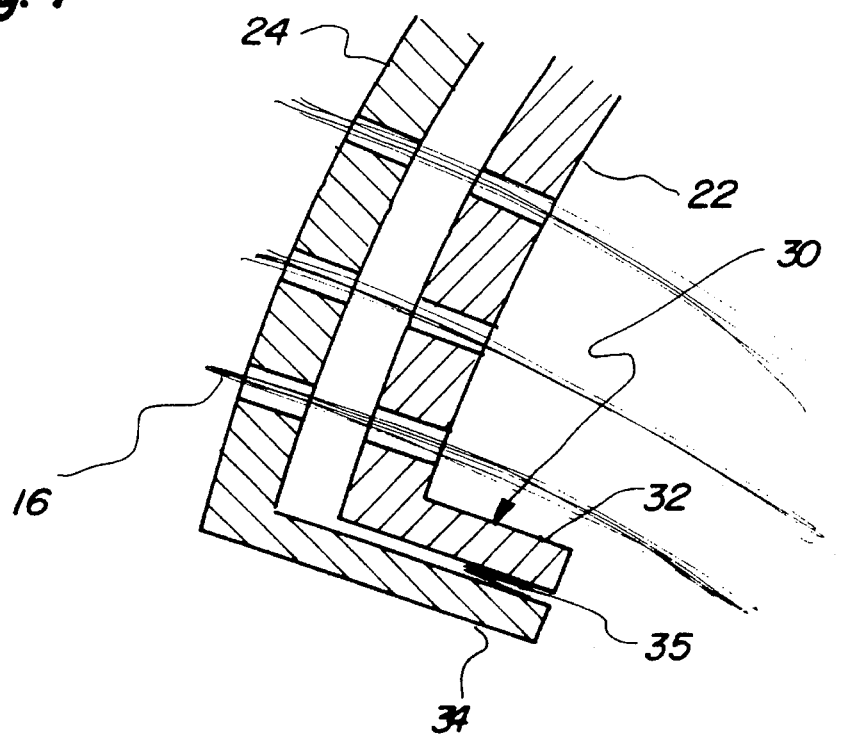
FIG. 7 is an enlarged cross sectional view of the area set forth in FIG. 5.
Figure 8:
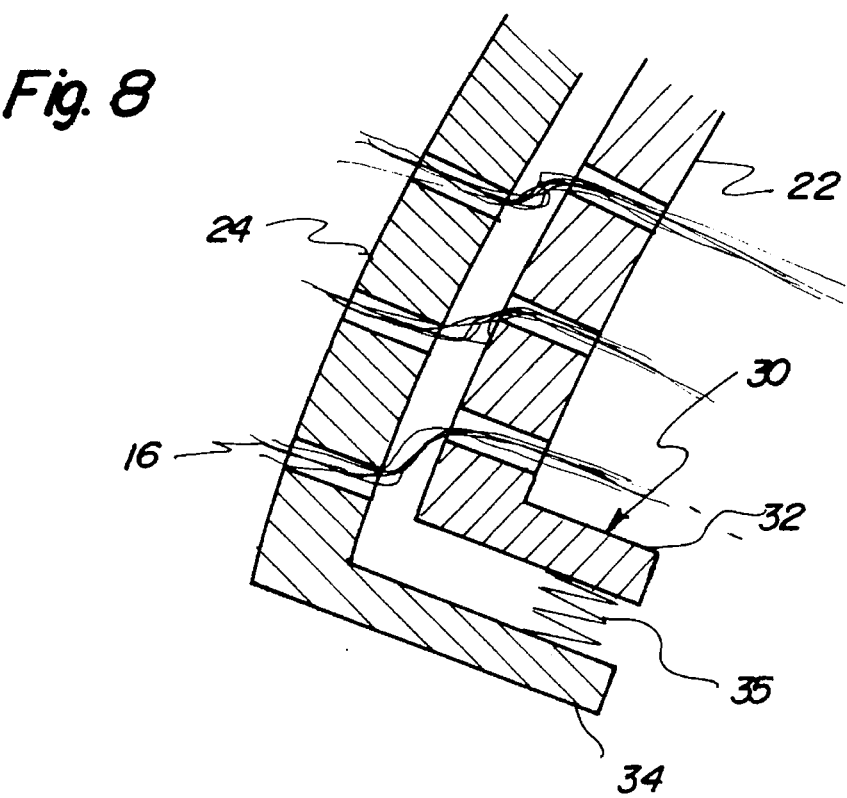
FIG. 8 is an enlarged cross sectional view of the area shown in FIG. 7 with the helmet portions in an offset position.

To effect automatic locking of the hair 16 relative to the helmet assembly 18, the present invention includes a helmet offset locking means 30 for positioning the outer perforated helmet 22 and the inner perforated helmet 24 into a normally offset portion to lock the hair 16 as described above. To this end and as shown in FIGS. 7 and 8, the helmet offset locking means 30 comprises an outer locking tab 32 projecting from the outer perforated helmet 22 and an inner locking tab 34 projecting from the inner perforated helmet 24. A spring interposed between the locking tabs 32 and 34 biases the tabs apart, as shown in FIG. 8, to effect offsetting of the outer perforated helmet 22 relative to the inner perforated helmet 24. When it is desired to extend hair 16 from the hair supply means 14, the locking tabs 32 and 34 can simply be manually biased together, as shown in FIG. 7, to effect pivoting of the outer perforated helmet 22 relative to the inner perforated helmet 24 such that the perforations thereof become aligned to permit dispensing of the hair 16 from the reel 20.

In use, the hair growing mannequin head 10 according to the present invention can be easily utilized in the instruction of a student, wherein the hair 16 of the device is either cut or styled, or both. Because the supply of hair 16 is replenishable, the present invention renders the mannequin head portion 12 reusable a plurality of times.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A hair growing mannequin head comprising:

a mannequin head portion; and, a hair supply means removably mounted to an upper portion of the mannequin head portion for selectively dispensing hair proximal to the upper portion of the mannequin head portion, wherein the hair supply means is in the form of a replaceable cartridge assembly which can be selectively separated from the mannequin head portion for replacement, wherein the hair supply means comprises a perforated helmet assembly which can be positioned into fitting engagement with the mannequin head portion to form a representation of a human head structure; a supply reel rotatably mounted within the helmet assembly; a plurality of strands of hair stored on the reel for dispensing through perforations in the helmet assembly.

2. The hair growing mannequin head of claim 1, wherein the hair supply means further comprises a locking means for selectively retaining the hair relative to the helmet assembly.

3. The hair growing mannequin head of claim 2, wherein the helmet assembly comprises an outer perforated helmet positioned over a similarly shaped inner perforated helmet such that the perforations of the helmets can be selectively aligned and offset to form the locking means.

4. The hair growing mannequin head of claim 3, wherein the reel includes an axle, and further wherein the outer perforated helmet and the inner perforated helmet each include a pair of opposed reel mounting apertures through which the axle of the reel projects both to rotatably mount the reel within the helmet assembly and to pivotally couple the outer perforated helmet to the inner perforated helmet.

5. The hair growing mannequin head of claim 4, and further comprising a helmet offset locking means for positioning the outer perforated helmet and the inner perforated helmet into a normally offset portion to lock the hair relative to the helmet assembly.

6. The hair growing mannequin head of claim 5, wherein the helmet offset locking means comprises an outer locking tab projecting from the outer perforated helmet and an inner locking tab projecting from the inner perforated helmet; a spring interposed between the locking tabs for biasing the tabs apart to effect offsetting of the outer perforated helmet relative to the inner perforated helmet, wherein the locking tabs can be manually biased together to effect pivoting of the outer perforated helmet relative to the inner perforated helmet such that the perforations thereof become aligned to permit dispensing of the hair from the reel through the perforations.

* * * * *